Aug. 23, 1938.  S. P. MILLER  2,127,694
PROTECTION OF PIPES
Filed March 27, 1936  2 Sheets-Sheet 2
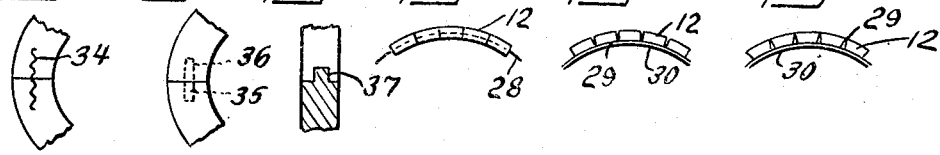
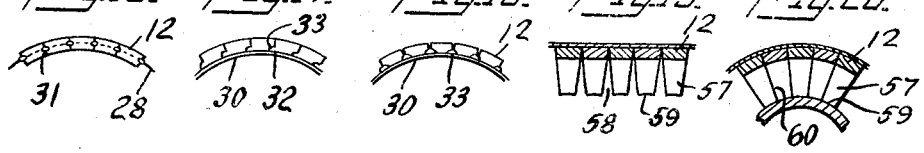
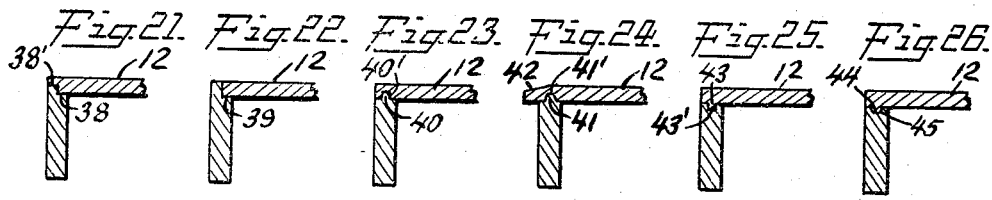
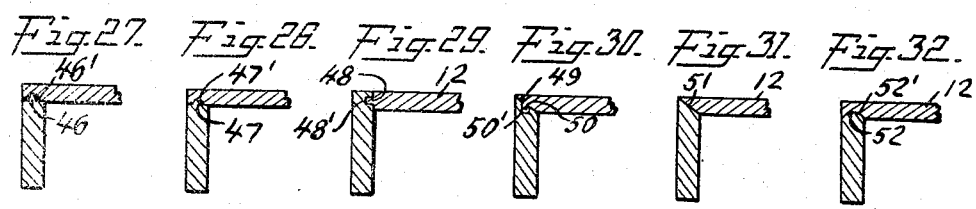
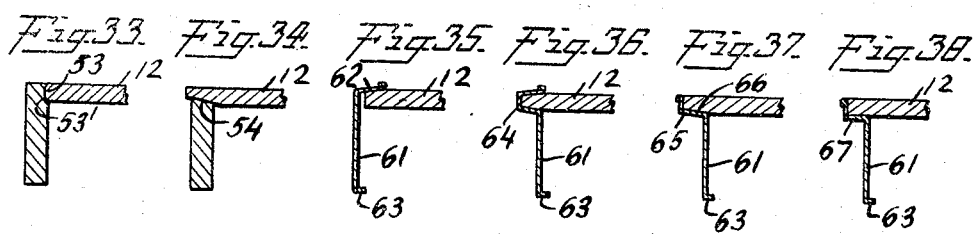
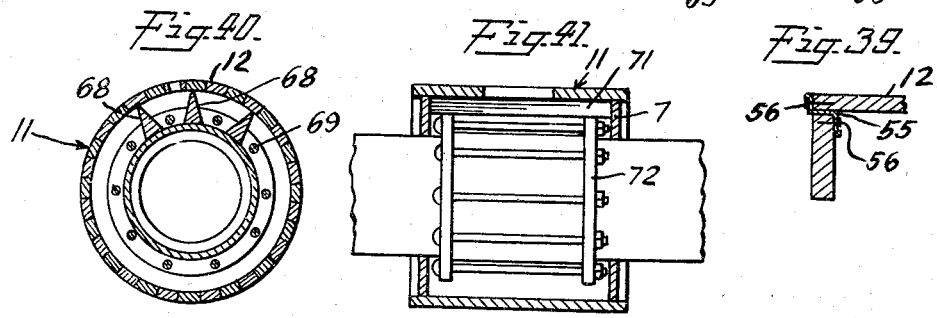
INVENTOR
Stuart P. Miller
BY
ATTORNEY Patented Aug. 23, 1938

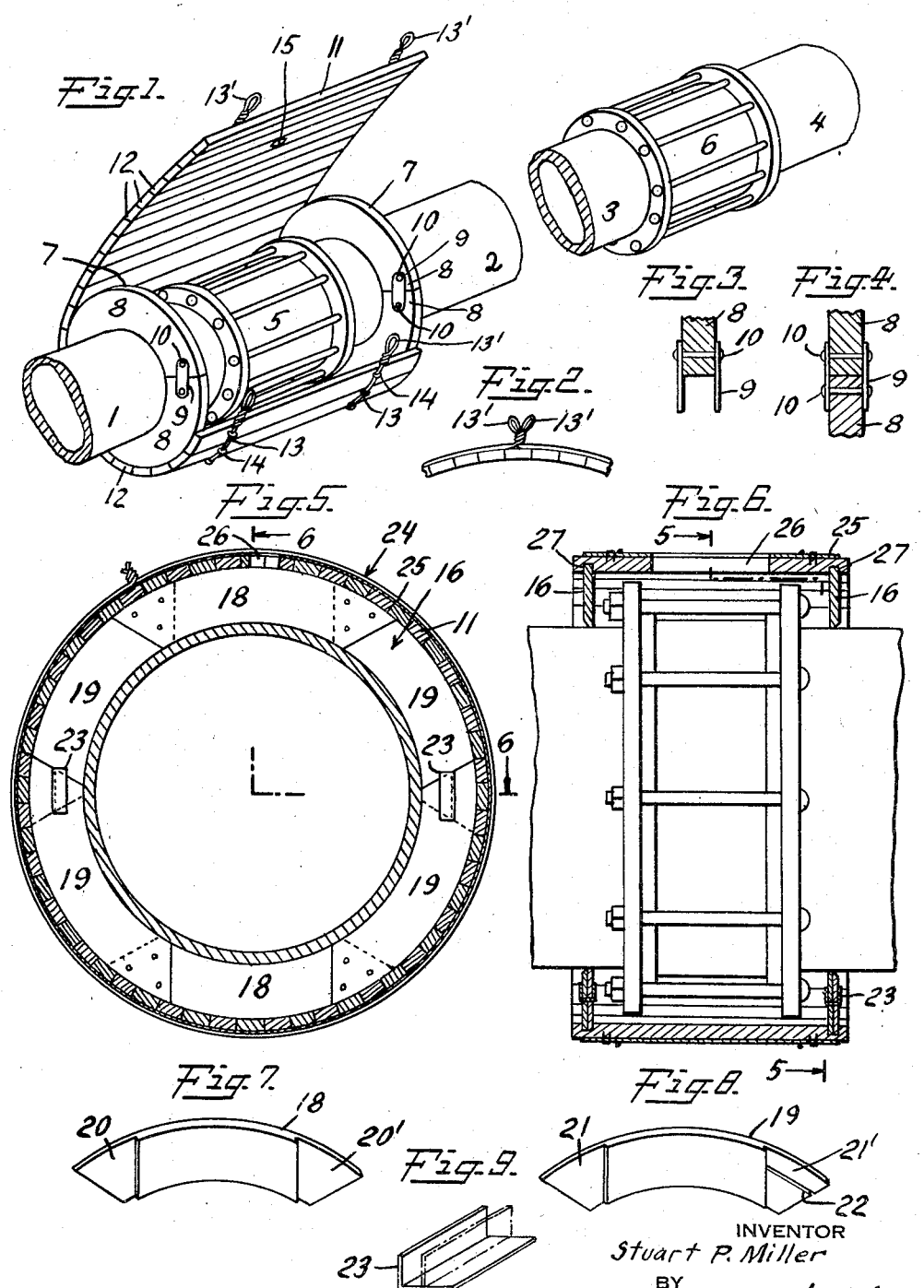

2,127,694

UNITED STATES PATENT OFFICE 2,127,694

PROTECTION OF PIPES

Stuart P. Miller, Scarsdale, N. Y., assignor to The Barrett Company, New York, N. Y., a corporation of New Jersey Application March 27, 1936, Serial No. 71,167

5 Claims. (Cl. 285—98)

This invention relates to the protection of pipe lines against deterioration, and more particularly, to a method and apparatus for protecting joints of pipe lines buried in the ground against the destructive chemical action of the soil and soil water by protecting the chemically inert coating materials ordinarily used for covering pipe joints against erosive, puncture and shearing effects of soil movement.

In the development of long-distance transmission of oil and gas through pipe lines, it has been found necessary to protect the steel pipes ordinarily used against the severe corrosive and chemically destructive action of soils and of water and other agents contained in the soil through which such pipe lines pass. Such destructive conditions are particularly severe where stray electric currents are found or where electric potential differences exist on, and in the neighborhood of, such pipe lines. The investment in such pipe lines is large, and without some means of protection against loss by corrosion and deterioration, replacement costs would be excessive. It has, therefore, become standard practice in laying such pipe lines to coat the pipes with various types of chemically inert coating materials, especially bituminous paints and enamels.

Coatings of this type are frequently applied in a molten condition to a rotating section of the pipe, the coating cooling to a hard, tough film immediately after application. Such bituminous coatings are usually of a relatively high melting point, for example 145° F. or upwards, and when cold, present a hard and tough surface to the soil in which the pipe is buried. A particularly desirable coating material of this kind is the mica pitch compound disclosed in Eckert Patent No. 1,773,131, issued August 19, 1930.

It is customary to coat pipe with such compound in the field at the side of the ditch in which it is to be laid, rotating the pipe sections on so-called "rolling-rigs" of well-known design. This method of application limits the length of section which can be rotated in such apparatus, depending upon the diameter of the pipe. For example, it is ordinary practice to weld together three sections, each twenty feet long, of, for example, 24-inch diameter pipe, and coat the resulting section, sixty feet in length, on a rolling-rig in one operation.

These sections of pipe when coated with protective enamel may be coupled together with some type of expansion joint or coupling and lowered into the ditch. The expansion couplings allow a certain freedom of movement, permitting the pipe to expand and contract with changes in temperature without buckling or leaking. Expansion couplings may consist of sleeves sufficiently large to slip over the pipe, and placed so as to span the joints between adjacent pipe sections, together with follower or compression rings, which are drawn by means of bolts against rubber or composition gaskets, thus closing the joints between the sleeves and the pipe line. This arrangement makes a tight joint which, at the same time, permits a certain amount of relative movement between the component parts. A well-known coupling of this type is the "Dresser coupling", shown diagrammatically in Fig. 1 of the drawings.

Because of the sliding of its component parts on the pipe forming the pipe line in assembling the coupling and because the ends of the pipe section rest on rollers of the rolling-rig during coating, it is customary, in coating the pipes with the protective compositions described above, to leave a portion at the end of each section bare of enamel, for example, about 10 or 12 inches.

After assembly of the couplings on the pipe sections which it joins, it is necessary to coat the uncoated ends of the pipe section and the exposed parts of the coupling with a protective enamel or paint. This may also be a bituminous material with a mineral filler, such as mica. It has been found necessary, and is common practice, to use a much softer, more fluid and ductile coating for this purpose than is used to cover the main body of the pipe. This is made necessary by two factors; namely, (1) the enamel or paint applied at the coupling must be sufficiently tenacious and at the same time sufficiently ductile not to crack or separate when the separate parts of the joint move relatively to each other owing to expansion and contraction caused by the changes described above, or caused by stresses set up in lowering the pipe into position or by soil movement after the pipe has been laid; and (2) the somewhat complex shape of the coupling—its recesses and protuberances—make it necessary to use a fluid enamel and one that does not set too rapidly in order to ensure that all parts of the coupling and adjacent pipe surfaces be effectively coated with the protective material. The use of a material which meets these conditions, however, has one grave disadvantage; namely, that such a material is not sufficiently resistant to the shearing and erosive action of the soil, both during the filling-in operation after the pipe has been laid and subsequently. Such soil movements frequently rub or shear away the softer coupling enamel completely from the metal surfaces which it covers and subject such exposed surfaces to the destructive conditions to which pipe lines are subjected. Hence, the joints or couplings are the weakest points in the pipe line and are usually the first to fail.

It has been proposed to apply removable metal housings to pipe couplings during the coating of such couplings as a means of keeping the coating material in place until it has hardened, and then to remove the housing. Such a procedure involves the use of cumbersome and complicated equipment and affords no protection for the coating after the pipe has been buried.

An object of this invention is to provide a durable housing of simple construction which can easily and readily be made, transported and applied around pipe couplers, valve housings, expansion joints, fittings, etc., at minimum cost. Further objects of this invention will be apparent from the following description:

This invention comprises a flexible housing comprising a plurality of staves or slats loosely connected one to another so that they form an articulated mat-like member which can readily be wrapped about a coupler or other part of the pipe to be protected. This mat may be employed in conjunction with a pair of end members adapted to be placed on the pipe line contiguous to the ends of the coupler. The articulated mat may be fastened to the end members forming therewith a housing completely surrounding the coupler. This housing may be filled with a protective composition resistant to the corrosive action of the soil.

An important advantage of this invention resides in the extreme ease with which my housing may be constructed, stored and applied to the pipe. The staves or slats, when joined to one another, to form an articulated mat, may be laid flat, and the mats piled one on top of the other for purposes of storage and transportation. By so doing conservation of space in storing and shipping the housings is achieved. Similarly, the end members are flat, thus facilitating handling, storage and transportation thereof. In addition to the saving in space, the danger of breakage of the component parts of the housing is minimized, if not eliminated, owing to the compactness of the bundles of the articulated mats, permitting ready and efficient crating. Furthermore, owing to the simplicity of the housing structure, the application thereof to pipe lines does not require the services of skilled labor.

In the accompanying drawings, forming a part of this specification, and showing, for purposes of exemplification, preferred forms of this invention without limiting the claimed invention to such illustrative instances, Fig. 1 is a fragmentary perspective view of a pipe line showing a pipe coupler housing embodying this invention in partial assembly about one of the two pipe couplers depicted in this view;

Fig. 2 is a fragmentary detail illustrating one means for securing a portion of the pipe coupler housing in position;

Figs. 3 and 4 are fragmentary detail sectional views depicting alternative means for fastening the segments of sections defining the head or end members of the housing;

Fig. 5 is a transverse sectional view taken on line 5—5 of Fig. 6, illustrating a modified form of coupler housing constructed in accordance with this invention;

Fig. 6 is a longitudinal sectional view, partly in elevation taken on line 6—6 of Fig. 5.

Fig. 7 is a perspective view of a segmental member forming a part of the coupler housings of Figs. 5 and 6. Fig. 8 is a perspective view of another segmental member forming a part of the housing of Figs. 5 and 6. Fig. 9 is a detail perspective view illustrating a metal plate which may be employed in assembling the housing of Figs. 5 and 6.

Figs. 10, 11 and 12 are fragmentary detail views depicting alternative means for fastening together the segments defining the end members of the housing of Figs. 1 and 5, Figs. 10 and 11 being end elevations and Fig. 12 a vertical section;

Figs. 13 to 18 are fragmentary end elevational details showing different shapes for the staves or slats forming the articulated mat such as shown in Fig. 1, and further disclosing different methods of fastening the staves of the mats;

Figs. 19 and 20 are fragmentary details depicting a modification of the housing in which the staves or slats of the articulated mat are attached to segments which, when assembled on the pipe about the coupler, form the end or head members; Fig. 20 is a side elevation, partly in section, showing the assembly in position on the pipe, and Fig. 19 is an elevation showing the assembly with the articulated mat lying flat and the segments of the end member extending up from the slats;

Figs. 21 to 34 are fragmentary vertical sections showing different methods of joining the staves, which comprise the housing, to the peripheries of the end or head members;

Figs. 35 to 38 are fragmentary vertical sections illustrating modifications of this invention in which the staves or slats are attached to metallic end members;

Fig. 39 is a fragmentary vertical section illustrating a modification in which a metal attaching member secures the heads or end member to the staves or slats of the articulated mat.

Fig. 40 is a transverse sectional view through a coupler housing and illustrates one means for supporting a part of the weight of the housing with respect to the pipe; and Fig. 41 is a longitudinal section partly in elevation through a housing surrounding a coupler and illustrates an alternative means for supporting a part of the weight of the housing on the coupler.

In the drawings, 1, 2, 3 and 4 denote sections of pipe line, the sections being placed in abutting relationship and fastened together by means of pipe couplers 5 and 6 as shown in Fig. 1. Annular end or head members 7 of a thickness to render them sufficiently rigid when in position are fitted about pipe sections 1 and 2 contiguous to the pipe coupler 5. The end or head members 7 may be constructed in one piece for applying to the pipe, prior to attaching the pipe sections 1 and 2 together. If it is desired to apply the housing to the pipe after the sections of pipe have been joined or coupled to form the pipe line, the end or head members 7 may be composed of segments or sections. In the embodiment shown in Fig. 1 end or head members 7 constituted of two semi-annular sections 8 are employed. Upon application of the sections 8 to the pipe, the ends thereof are held in position by metallic tie plates 9. The tie plates 9 may be attached to one of the segments 8 of the end or head member 7 by means of rivets 10 (Fig. 1) prior to assembling the end member about the pipe. After the segments 8 are brought into abutting relation the free ends of the metal plates 9 are riveted to the other segment as shown in Fig. 4, so that the segments are held firmly together.

An articulated member 11 comprising a plurality of staves or slats 12 is adapted to be wrapped about each pipe coupler. In the form of the invention shown in Fig. 1 the staves or slats are flexibly fastened together by means of wires 13 which pass through staples 14 fastened to the staves or slats 12.

The ends of the wires 13 may be provided with loops 13' or may be rigidly fastened to the end slats of the articulated mat, as for instance by means of a metal fastening member riveted to the end slats. In case the ends of the wire are left free and are provided with loops, when the articulated mat is wrapped in position about the pipe coupler and the ends thereof brought into abutting relation, a suitable tool may be inserted through the loops 13' and turned to twist and tighten the wires as illustrated in Fig. 2 to secure the mat in position. The ends of the staves may merely rest on the peripheries of the end members 7 as shown in Fig. 1. If desired however, suitable joining means, to be hereinafter described, may be employed to secure the ends of the staves to the head members 7. A hole 15 is provided in one of the staves to permit the housing to be filled with a suitable coupler compound.

After the assembly is completed, the space remaining within the coupler housing is filled with a suitable protective compound such as bitumen (e. g. asphalt, coal tar pitch, etc.), mica pitch composition or the like through hole 15. It is preferred to make two additions of the protective compound, one a few hours after the other, to allow for any shrinkage which might occur due to cooling. The compound should be poured through the hole 15 slowly, to ensure complete displacement of air from within the housing. If desired, boards or other members may be placed on the coupling to fill the space between the coupling and the housing, thus reducing the amount of compound required to fill the housing. Such boards may be made integral with the staves or attached thereto and disposed on the staves to fill the space between the bolts connecting the ring members of the coupling. After the addition of coupler compound has been completed the hole may, if desired, be plugged or closed in any suitable manner.

The space between the staves 12 and the end member 7 may be made liquid tight by the use of a lute such as clay, which may be mixed with asbestos. Instead of such clay lute, candle wicking, oakum, cement or the like or gaskets made of rubber, felt, leather, etc. may be fitted into the joint to produce a liquid-tight joint between the end or head member 7 and the articulated mat 11. If desired, to reinforce the housing, metal bands may be placed about the pipe, the ends riveted and the hoops thus formed, forced onto the coupler housing. The outside of the coupler housing may be coated with pitch, paint or any suitable waterproofing composition to provide more complete protection against the soil.

In the embodiment of the invention illustrated in Figs. 5 and 6, the end sections designated as a whole by reference numerals 16 are constituted of a plurality of segmental members 18, 19 shown in detail in Figs. 7 and 8. Each of segmental members 18, 19 is provided with reduced end portions designated in the drawings by reference numerals 20, 20', 21, 21'. Relatively narrow slots 22 extend into the reduced end portions 21' of the members 19. The members 18 and 19, may be assembled to form end members 16 by nailing or otherwise securing the reduced end portions 20 of the members 18 in overlapping relation to the complemental reduced ends 21 of two segmental members 19 to form semi-circular segments. Two of the semi-circular segments are placed about the pipe, one at each end of the coupler, with their reduced ends 21' in overlapping relation and the slots 22 in registration. For securing the slotted ends of the members 19 together, metal, which may be brass, plates 23, illustrated in detail in Fig. 9, may be employed. These plates are preferably of the same length as the slots 22 and may be inserted through the registering slots 22 after the semi-circular segments are assembled about the pipe or may be inserted in the slot of one of the segments and the segments then assembled. The side edges of the plates are bent over the sides of the members 19, as shown in Fig. 6. The plates are of such thickness that they substantially fill the slots to prevent leakage therethrough. In the embodiment of the invention illustrated in Fig. 6, six segmental members, two members 18 and four members 19, form each of the circular end members 16, but it will be apparent that any number of segmental members desired may be employed.

The articulated mat 24 shown in Figs. 5 and 6 may be formed by adhesively attaching, stapling or otherwise securing a sheet of flexible material, preferably impregnated roofing felt, to the outermost side of each of the slats 12. This mat is then wrapped about the end members 16 and may be secured in position by wires as described in connection with Fig. 1, hoops or other suitable means. Grooves 27 formed on the inner side of each of the staves 12 near the ends thereof form a continuous groove for the reception of edges of the end members 16 and serve to prevent leakage and provide a stronger construction. The joints between the staves and end members may, if desired, be luted and the housing filled with protective material through the opening 26, as hereinabove described in connection with the housing of Fig. 1.

It will be understood that the staves or slats 12 may be made of any desired shape. They may be flat, longitudinally and laterally as shown in Fig. 1, or they may be curved in transverse cross-section as shown in Figs. 13, 14 and 15. In Fig. 13 the staves or slats 12 are curved to conform to the contour of the end members. Such a construction provides complete surface contact along the edges of the staves forming a liquid-tight joint. The staves or slats 12 of Fig. 14 or 15 are designed to provide only a line contact joint 29 between contiguous staves. In such case liner sheets 30 or similarly effective sealing means are provided if a liquid-tight closure is desired. The liner sheets function to maintain the staves in assembled relation as hereafter more fully pointed out. The staves or slats may be provided with longitudinally-extending articulating members, such as the cylindrical rods 31 disposed in grooves in the longitudinal edges of contiguous staves as shown in Fig. 16, or the semi-cylindrical joining members 33' (Fig. 18) fitted into grooves formed in the base edges of the staves. In cases where a housing of adjustable diameter to accommodate different sizes of pipes is desired, the staves or slats 12 are preferably formed with projections 32 (Fig. 17) of general cylindrical shape on one side edge and complemental grooves 33 on the other side edge. The slats are arranged with the projections 32 of one slat entering into the grooves 33 of a contiguous slat forming a joint between the sides of contiguous slats which is tight throughout a range of angular variations between adjacent slats.

Instead of holding the staves or slats together by means of wires 13 affixed to the surface, the wires may be fixed to the ends of the slats or disposed in grooves cut in the staves. Another method for flexibly holding the staves or slats together is to pass wires 28 (Figs. 13 and 16) through holes bored through each of the staves. Alternatively metal bands may be used for the purpose, the metal bands being riveted to the staves or slats. When the housing is in position the ends of the bands may overlap sufficiently so that they may be riveted to one another to bind the staves in place.

Another method of flexibly binding the staves to form the articulated mat is to secure the inner sides of the staves to a flexible sheet or liner 30 (Figs. 14, 15, 17 and 18), as for example by riveting, or adhesively attaching the staves by any suitable cementing composition to the liner. Liners are especially useful in case the staves or slats are so constructed that they meet in line-to-line joints as in Fig. 14. If the staves are to be shipped flat or unrolled, outside liners may be fastened securely to each stave to hold the staves as a unit. If, however, it is desired to use inside liners in conjunction with the outside liners, it is expedient that such inside liners be fastened only to the staves at one end of the mat in order to forestall buckling of said liner when the mat is applied to the coupler. Such flexible sheets or liners may be made of any reasonably tough sheet material, such as impregnated or coated fabric, paper, felt, metal, metal coated fabric, canvas, asphalt roofing or the like. In addition to applying liners to the staves, all parts of the housing may be so covered as an added protection against the action of soil waters.

The shape of the end members is not limited to the form depicted in Figs. 1 and 5. If desired they may be elliptical or polygonal or in any other suitable form, the staves or slats being formed to fit the type of end members used.

In place of the metal fasteners 10 of Fig. 1, and the nails and metal plates 23 of Fig. 5, other means for fastening the segments of the end members together may be employed. For example, these segments may be placed in abutting relation and a corrugated fastener 34 (Fig. 10) driven into them transversely to the joint as shown in Fig. 10. If desired, dowel pins 35 (Fig. 11) may be fitted into the edges of one segment, in such a manner that a tapered portion 35 projects and fits into a hole bored into the edge of the adjoining segment, where it may be glued to form a tight connection. Fig. 12 shows the use of a tongue and groove joint for the purpose of joining segments of the end members together. Such joints extend along the entire edge of the segment, one edge being fitted with a tongue member and the other being fitted with a groove and the tongue of one member fitting snugly into the groove of the next, as indicated by reference numeral 37.

In the preferred embodiment of this invention it is proposed to construct both the staves 12 and the end sections of wood impregnated with creosote, since such material is inexpensive and readily available and the creosote impregnation provides effective protection against mold or decay. However, if desired, the housing of this invention may be constructed, in whole or in part, of any sufficiently rigid material, such as asbestos composition, plywood, fiber board, chip board, felted material, artificial wood, resinous or fibrous material, such as preformed or molded resinous material and papier mâché, respectively, etc. These materials may be impregnated with stiffening, waterproofing material, such as resin or bitumen, and/or fungicidal agents.

As shown in Fig. 1, and as described above, the articulated mat of staves 11 may merely rest on the peripheries of the end members, being held in position thereon by means of wires or bands encircling the housing. If a more rigid housing is desired the staves or slats 12 may be nailed or otherwise secured in position after they are wrapped about the coupler. Alternatively the segments of the end members may be joined to the staves or slats 12 by means of joints such as those depicted in Figs. 21 to 34.

For instance, the circumferential edge of the end or head members 7 may be rabbeted, as indicated by reference numeral 38 so as to make a flush joint with a complemental rabbet 38' cut in the adjoining ends of the staves 12 as shown in Fig. 21, or the end or head members 7 may be provided with a deep rabbet adapted to receive the ends of the staves, as indicated by reference numeral 39 in Fig. 22. If desired, the circumferential edge of the end or head members may be constructed with a flange member or tongue 40 adapted to be fitted snugly into a groove 40' cut in the inner surface of the ends of the staves 12, as shown in Fig. 23. Fig. 24 depicts a modification of such a tongue and groove joint in which the tongue member 41 and the groove 41' are beveled so that they form a tight joint with each other. It will be observed that the top sides of the ends of the slats 12 are disclosed as beveled at 42 in Fig. 24. This construction facilitates driving or otherwise assembling hoops around the articulated mat to secure the latter in position with respect to the end members and coupler. In Fig. 25 is shown a tongue and groove joint in which the tongue member 43 is integral with the staves 12 and the complemental groove 43' is cut in the circumferential edge of the end or head member and Fig. 26 depicts a similar type of joint in which the tongue 44 and the groove 45 are beveled to form a flush joint with one another. In order to facilitate assembly the tongue member 46 (Fig. 27) may be beveled and adapted to fit loosely into groove 46' cut in the staves 12 having the sides thereof more obtusely beveled than the corresponding tongue member. Furthermore, if desired, the edge of the end or head member may be fitted with a flange member or tongue 47 having a semi-circular cross-section, said tongue being adapted to fit into a complemental semi-circular groove 47' cut in the staves, as shown in Fig. 28.

Figs. 29 and 30 depict modifications of the tongue and groove joints, the construction in Fig. 29 involving staves 12, having a tongue or flange member 48 at the ends thereof fitting into a complemental groove 48', cut into the inner surface of the end or head members near the circumferential edge. Fig. 30 shows staves 12 and end or head members, each having the edges thereof beveled and adapted to abut, as indicated by reference numeral 49, the beveled edge of the staves 12 being provided with a flange or tongue 50 adapted to make a flush joint with complemental grooves 50' cut in the beveled edge of the end or head members.

Other types of joints are depicted in Figs. 31 to 33. One end of head members may be beveled and adapted to abut with a complemental bevel cut at the edges of the staves 12, as indicated by reference numeral 51 in Fig. 31. Alternatively, the end or head members may be provided with rounded edge 52 adapted to form a flush joint with a curved groove 52' cut in the underside of the staves near the ends thereof, as shown in Fig. 32, or vice versa the staves 12, may be provided with rounded edges 53 which fit into a groove 53' cut in the inner surface of the end of head members. As shown in Fig. 34, the edge of the end or head member may be beveled and adapted to abut against a complemental beveled surface cut in the interiorly-disposed surface of the staves 12 at the ends thereof, as indicated by reference numeral 54.

Instead of having the staves 12 and end or head members attached to one another by means of joints an intermediate metal joining member 55 may be provided, as shown in Fig. 39. Such a joining member may be shaped in the form of a Z and the staves and end members nailed thereto by means of nails 56 (Fig. 39).

In Figs. 19 and 20, end members composed of a plurality of segments 57, are shown. These segments are fixed to the staves or slats 12, which form the articulated mat of staves 11 described above, as for example by riveting, etc., forming an integral assembly of slats and head members at the ends of the staves constituting the mat. This assembly is shown with the segments constituting the head member extending up from the mat in Fig. 19. It will be noted that when the mat is in flat position, the segments are separated by spaces 58. When this assembly is placed about the coupling as shown in Fig. 20, with the curved ends 59 of the end members resting on the pipe as shown in this figure, the segments are brought into contact, i. e., the sides of the segments of the head members abut, as indicated by the reference numeral 60 in Fig. 20.

Metal end members, such as shown in Figs. 35 to 38 may be employed instead of the wood or composition head members of Fig. 1. For instance, as indicated in Fig. 35, the metal end member 61 may be constructed with angle flange 62 at its circumferential edge adapted to fit over the edge of the staves 12, and with a right angle flange 63 defining the hole in the end member adapted to fit over the pipe. If desired, the circumferential edge of the metal end or head member 61 may be shaped in the form of a U, as indicated by reference numeral 64 in Fig. 36 and the ends of the staves 12 beveled on each side to facilitate forming a flush joint with the shaped edge 64 of the end or head member. Alternatively the circumferential edge of the end or head member may be shaped to contact with a portion of the interiorly disposed surface and also the end of the staves 12, as indicated by reference numeral 65 in Fig. 37; the staves in such case may have a beveled edge 66 (Fig. 37) or the ends may be unbeveled and the circumferential edge of the end or head member 61 shaped accordingly, as indicated by reference numeral 67 of Fig. 38. Segmental metal end members may be employed. Such members may be welded or riveted together before application to the pipe or may be welded in place around the pipe.

The staves of the articulated mat 11, after wrapping about the coupler, may be drawn into abutting contact, each stave with its two neighboring staves, by twisting together the ends of the wires 13 of Fig. 1. Ordinarily, however, to avoid danger of breaking the wires at the point where they are twisted together, it is preferable to apply circumferential tension around the mat of staves by means of circumferential tightening clamps of any well known form, e. g. flexible straps or cables having turn-buckles or similar tightening devices at their ends. When the edges of adjacent staves are drawn into abutting position, and fastened, as by twisting together ends of wires 13, the clamps may be removed. Alternatively, metal hoops may be used instead of wires, said hoops being provided with nuts and bolts, turn-buckles or the like to facilitate drawing the staves tight prior to fastening them in position. Separate tightening clamps will then ordinarily not be required.

A preferred construction of pipe coupler housing involves wooden slats cemented, stapled or otherwise fastened to a flexible felt base and having tie wires disposed over the felt base. Two or more such wires may be used, one disposed near each end of the mat and the wires may be passed through staples passing through the felt into the staves, the wires being disposed on top of the felt. Such mat, the felt base and wires being on the outside, is wrapped about the coupler having end or head members at each side thereof as shown in Fig. 1 and the ends of the tie wires secured together to fasten the mat in place.

Fig. 40 shows segmental supporting members 68 positioned within the housing. These members extend between the bolts 69 of the coupler with their inner ends bearing against the pipe and their outer ends contacting with and tending to support the articulated mat 11. Fig. 41 illustrates another supporting means within the housing constituted of one or more cross bars 71 fastened to the inner sides of the end sections 7 and resting against the coupler rings 72. The segmental members 68 and cross bars 71 distribute the weight of the coupler housing and protective material with which the housing is filled and tend to prevent rupture or damage to the mat 11 and end members 7 due to localized stresses and damage to the enamel on the pipe by pressure of the end members thereon.

Since certain changes in carrying out the above process, and certain modifications in the article which embody the invention may be made without departing from its scope, it is intended that all matter contained in the above description or shown in the accompanying drawings shall be interpreted as illustrative and not in a limiting sense.

What I claim is:

1. A housing comprising a plurality of slats having their outsides secured to a sheet of flexible felt base material and forming with said felt base an articulated member, a plurality of segmental end members adapted to form end closures for the housing, said articulated member being adapted to be wrapped about said end members and to form therewith a housing for the reception of protective material.

2. A coupler housing comprising a plurality of wooden slats adhesively secured to a felt sheet and forming an articulated member adapted to be wrapped about a coupler to form a housing for protective material contained within said housing.

3. In a pipe line coupler housing, in combination, an articulated member adapted to surround the circumferential surface of the coupler and comprising a plurality of wooden slats, said wooden slats being joined by means of a sheet member attached thereto to form said articulated member and circular end members disposed about the pipe at opposite sides of the coupler, said articulated member being secured to the end members forming therewith a housing enclosing said coupler.

4. A rigid coupler housing for an underground pipeline comprising in combination a plurality of pipe sections joined together by a coupler permitting relative movement of the sections upon expansion and contraction thereof, said housing being adapted to surround said coupler and comprising annular end members adapted to be positioned about said pipe sections at the ends of said coupler and an articulated mat of narrow, rigid, longitudinal slats joined together by flexible means and adapted to be wrapped about said end members to form said housing, said housing adapted to contain bituminous protective material sufficiently soft and ductile to provide uninterrupted protection for said coupler notwithstanding relative movement of said pipe sections due to expansion and contraction thereof.

5. An underground pipeline comprising in combination a plurality of sections of pipe joined together by a coupler permitting relative movement of said pipe sections upon expansion and contraction thereof, a rigid housing surrounding said coupler, said housing comprising a plurality of annular end members positioned about said pipe sections at the ends of said coupler and an articulated member constituted of a plurality of narrow, longitudinal, rigid slats of creosoted wood joined together by flexible means wrapped about said coupler and secured to said end members to form said housing, said housing containing bituminous protective compound sufficiently soft and ductile to provide uninterrupted protection for said coupler notwithstanding relative movement of said pipe sections due to expansion and contraction.

STUART P. MILLER.